(12) United States Patent
Kwok

(10) Patent No.: US 7,303,209 B2
(45) Date of Patent: Dec. 4, 2007

(54) TRANSPORTATION RIDERS WEB RESTRAIN SYSTEM

(76) Inventor: Ming Yat Kwok, 1646 Frances St., Vancouver, British Columbia (CA) V5L 1Z4

( * ) Notice: Subject to any disclaimer, the term of this patent is extended or adjusted under 35 U.S.C. 154(b) by 340 days.

(21) Appl. No.: 11/093,249

(22) Filed: Mar. 29, 2005

(65) Prior Publication Data

US 2006/0220365 A1    Oct. 5, 2006

(51) Int. Cl.
*B60R 21/06* (2006.01)

(52) U.S. Cl. .................................................. 280/749
(58) Field of Classification Search ................ 280/733, 280/748, 749; 297/184.1, 184.11, 184.15, 297/188.04, 188.06, 188.07, 487
See application file for complete search history.

(56) References Cited

U.S. PATENT DOCUMENTS

| | | | |
|---|---|---|---|
| 2,025,822 A | | 12/1935 | Pryor |
| 3,650,542 A | * | 3/1972 | Shimano et al. ............ 280/749 |
| 3,692,327 A | | 9/1972 | Barricks ................ 280/150 B |
| 4,278,273 A | | 7/1981 | Schiff ......................... 280/802 |
| 4,569,534 A | | 2/1986 | Nalbandyan et al. ....... 280/742 |
| 4,592,523 A | * | 6/1986 | Herndon .............. 244/122 AG |
| 5,226,672 A | * | 7/1993 | Husted ........................ 280/749 |
| 5,529,341 A | * | 6/1996 | Hartigan .................... 280/749 |
| 5,547,219 A | | 8/1996 | Ha ............................... 280/749 |
| 5,564,747 A | * | 10/1996 | Ono et al. .................. 280/806 |
| 5,588,677 A | * | 12/1996 | Kopetzky et al. ........... 280/806 |
| 6,131,951 A | * | 10/2000 | Chicken et al. ............. 280/806 |
| 6,443,489 B1 | | 9/2002 | Ehrenberger et al. ....... 280/749 |
| 6,502,859 B1 | * | 1/2003 | Svetlik ........................ 280/749 |
| 6,672,619 B1 | | 1/2004 | Ennerdal et al. ............ 280/749 |
| 6,672,919 B1 | * | 1/2004 | Beson ...................... 440/89 R |
| 2004/0035631 A1 | * | 2/2004 | Schlecht et al. ............ 180/271 |

\* cited by examiner

*Primary Examiner*—Paul N. Dickson
*Assistant Examiner*—Joseph Rocca

(57) ABSTRACT

A transportation riders protection system has a web (22) including a head protection device (21) deployed from a case (20) by two cable pullers (50) and (90) protecting rider (80) from collision impact. An automatic sensor (51*b*), a warning system (51*e*) and also a manual switch (51*a*) give signal to the firing of the charge from the propellant housing (51). The piston (55) propelled down to the limit of effective range will release the cable (47). The end cap (54) vents the pressure and cushions the thrust of the piston (55). The multiple cable control housing (53) housed set of cable control (52). Equalizer-organizer case (40) contains cables (41) of different length joining cable (47) with an overload split ring (48) which will straighten if tension is over the set limit. The anchor-router (30) locks the web (22) in place after the cables (41) are pulled down from the cavities of the tubes (60) and (70), while puller (90) tightens mid section of the web. A windowed section (39) of a transit vehicle shows the transportation riders web restraint system fully deployed protecting a rider (80) sitting on a bench chair (100). The web system can protect and restraint one or more riders.

7 Claims, 10 Drawing Sheets

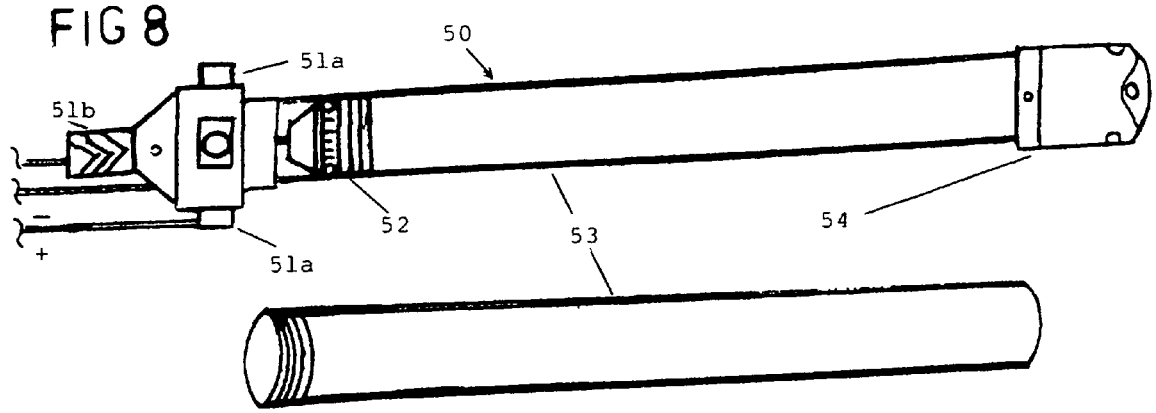
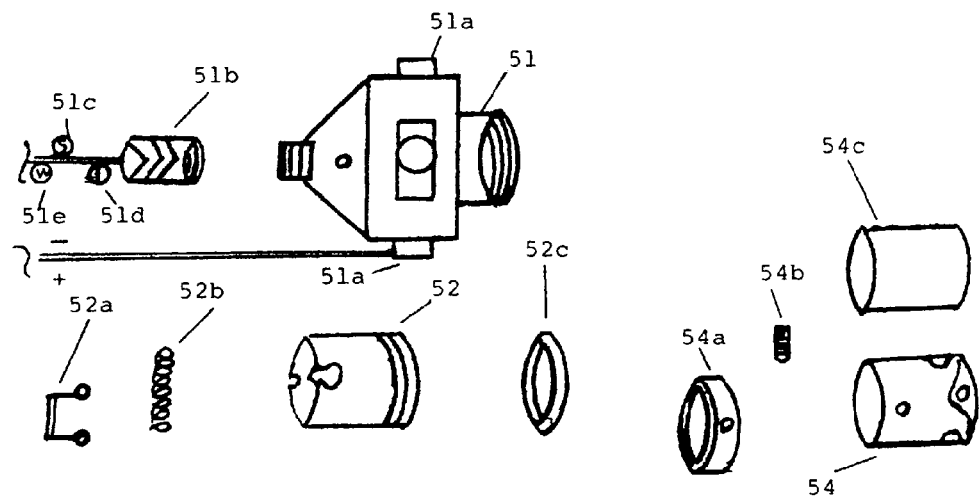
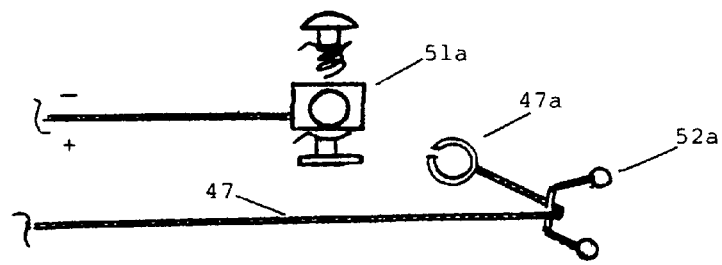
FIG 8

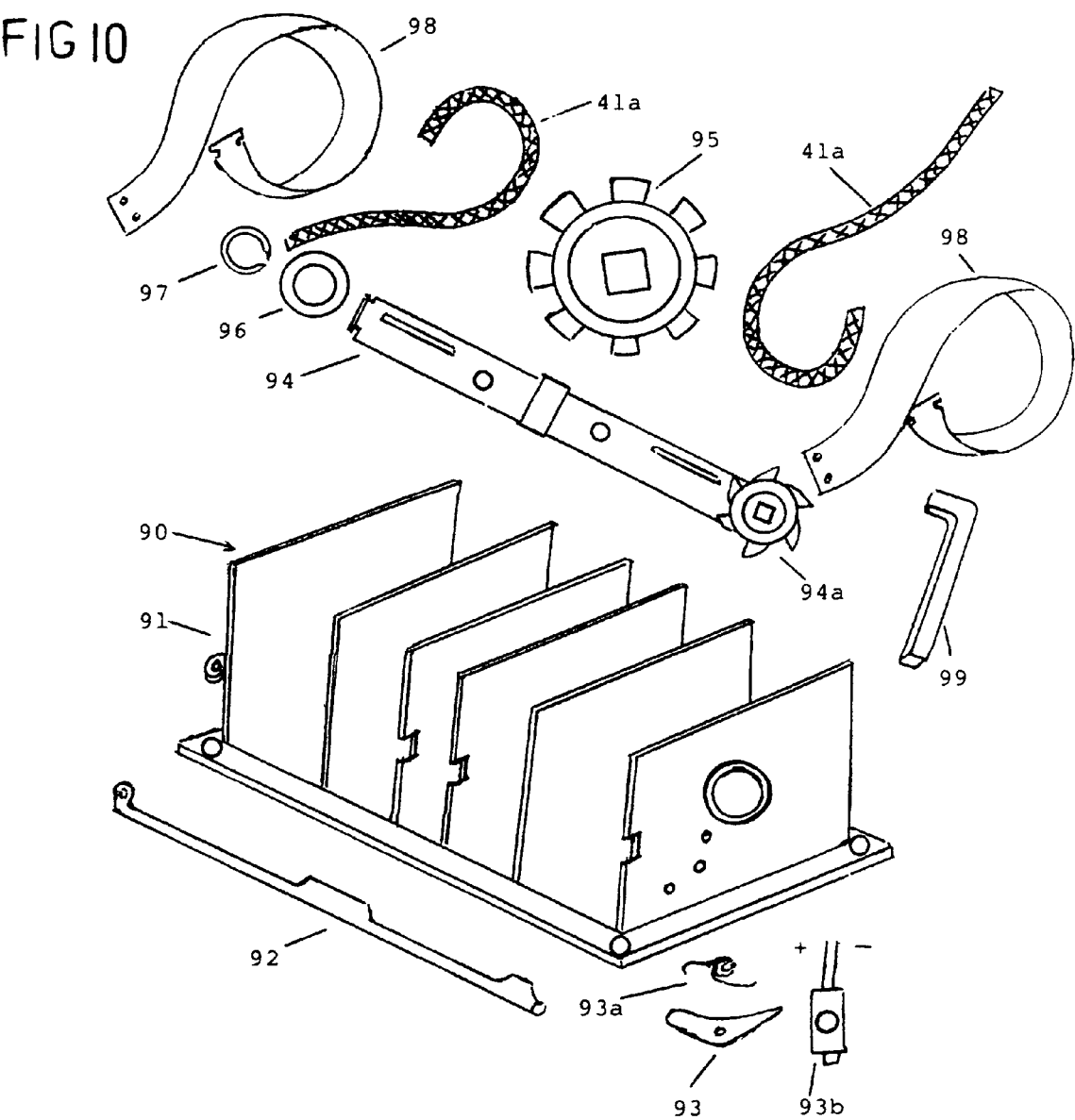

TRANSPORTATION RIDERS WEB RESTRAIN SYSTEM

BACKGROUND

1. Field of Invention

The present invention relates to safety web restrain system for transportation riders during an accident.

2. Description of Prior Art

Seatbelts and air bags are the protection devices for the present day occupants of vehicles. Sadly, in America and all over the world thousands of fatalities still occur every day and many thousands more are seriously injured. While seatbelts do have some protection merit but are often ineffective at times either when occupants do not put them on for various reasons or they are worn incorrectly or yet the seatbelt system is malfunction. The most common malfunction of the seatbelt system is the shoulder belt, it does not seem to be able to lock up when needed most. Studies show that sudden body movement during an accident results in injuries. Seatbelts are not the solution, then the airbag was invented. One airbag first and then two and then four, there will be more airbags yet to come in the newer vehicles. Airbags help cushion the driver against the steering column during the initial crash and not much more, the human body still has to endure the violent thrust during the collision and that is the major cause of injuries. Airbags help during the initial crash impact but offer no help at all if there is any subsequent collision following. The cost to replace a spent airbag and repair the damages caused by the discharge of the airbag is huge, regrettably, seatbelts and airbags though are of some help to the occupants during an accident, yet they do not at all installed on the transportation system vehicles with the exception of seatbelts on the aeroplane.

In U.S. Pat. No. 6,502,859 B1 (2003) issued to Robert W. Svetlik describe a back 3 net enclosure to protect the occupants of a vehicle during an accident, but nothing illustrated about restraining occupants from thrust against the ceiling, front seat, side doors and back window during an accident collision.

In U.S. Pat. No. 5,226,672 issued to Royce H Husted (1993) is disclosing a web restraining about ⅓ the body of a driver while holding the bottom part of the steering wheel, chances are, during an accident, the lower portion of the body will thrust forward and the web might not be able to stop the movement. Some drivers prefer to put one or both their hands at the top of the steering wheel, then the web will only cover the head and neck and that can be detrimental during an accident. The cable pull mechanism does not show a tension release system, in that case the upper arms will be bound by the web so tight that the driver will not be able to continue control of the vehicle.

The present invention deploys a restraining web with a headboard and when locked in place protects one or more persons from head to feet, and it is made of strong netting material that a person will be able to see through and maneuver accordingly, a person can unhook the web to walk away and the web can be reset and reuse again. A tailor made case is to store the web in place but when it is not practical, it can be incorporated with the seat.

OBJECTS OF THE INVENTION

A principle object of the invention is to provide a restraining safety web for the riders of the transportation system.

Another object of the invention is to provide protection for the riders without their participation Another object of the invention is to provide protection for the riders with emphasis to the head, neck, spine, abdomen and knees area.

Another object of the invention is to provide a warning system that a collision is about to happen or imminent.

Another object of the invention is to provide dual activation mode to engage the restraining web, manual activation, or fail to do so, automatic activation by sensor.

Another object of the invention is to provide a rider restraining web system that will not disintegrate during a collision accident.

Another object of the invention is to provide a safety web restraining system that after deployment the occupant can unhook the web and walk away.

Yet another object of the invention is to provide a web restrain system that is adaptable 10 other forms of vehicles.

Yet another object of the invention is to provide a rider web restraining system that is low cost and is easy to build.

BRIEF DESCRIPTION OF THE DRAWINGS

These and other objects and advantages of the invention will be apparent upon reading the following description in conjunction with the drawings, in which:

FIG. 8 is showing the cylindrical power cord retriever in whole and when various components are taken apart.

FIG. 10 is showing various components of the double leaf-springs cord retriever.

DESCRIPTION OF THE PREFERRED EMBODIMENT

Figure 1:
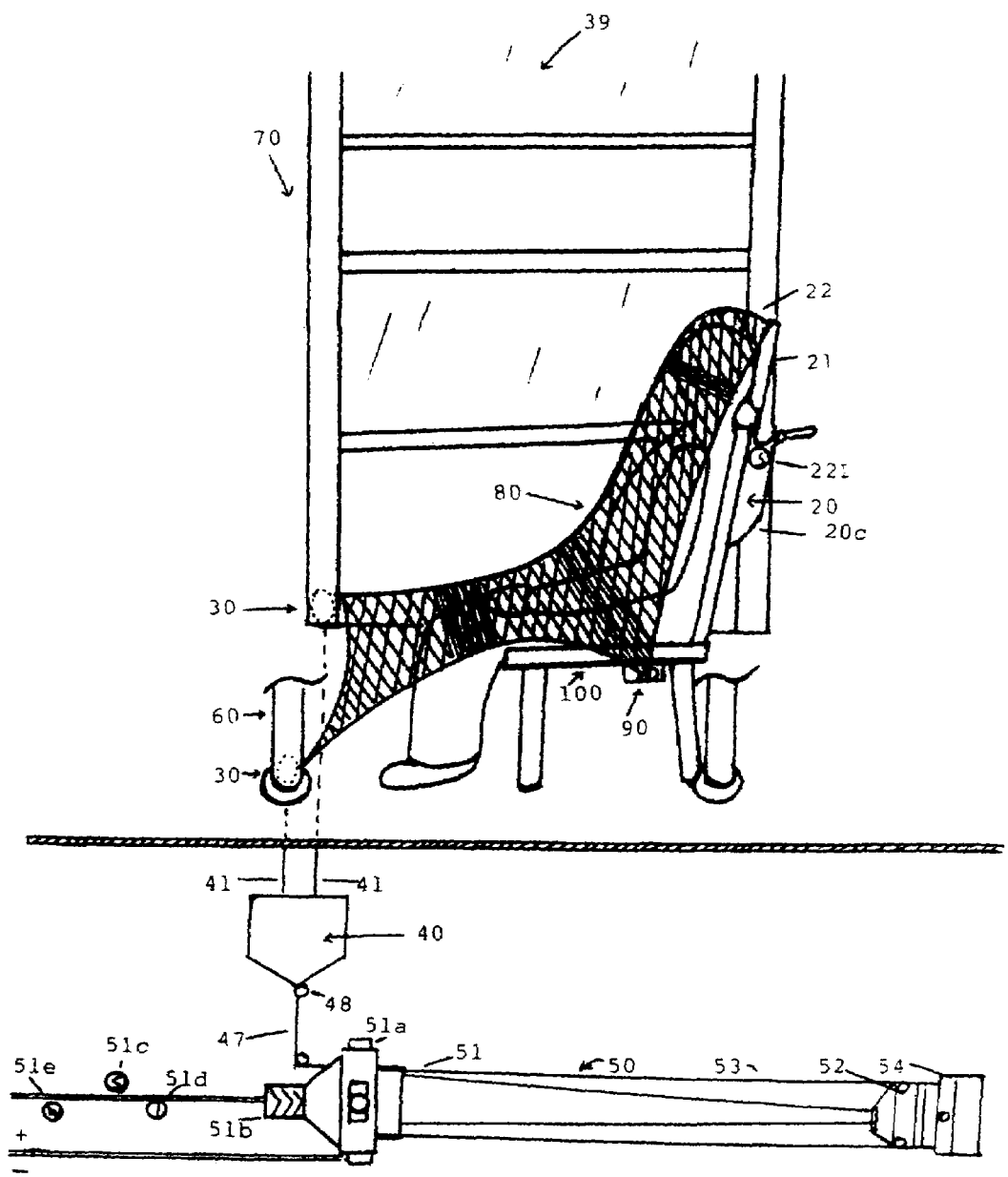
FIG. 1 is a partial cutaway side view of the inside window area of a public transit system bus with the restraining web system fully deployed retraining and protecting a rider sitting on a bench seat.

Referring to FIG. 1a cut away side view of a transportation rider 80 sitting on a bench seat 100 next to a window area 39 of a transit bus. A fully deployed restraining web 22 complete with a head and neck protecting device 21 is anchored at the bottom of the tubes 60 and 70 fully protecting the rider 80. Cylindrical power cord retriever 50 retrieves cord 47 through a cord organizer-equalizer case 40 where cords 41 are being organized and joined at an overload split ring 48 with cord 47, cords retrieved through the anchor-router 30 and locked down fully engaged the restraining safety web 22, a switch 22L at end cap 20c activates leaf-spring retriever 90 and tighten up mid-section of the web 22.

Figure 2:
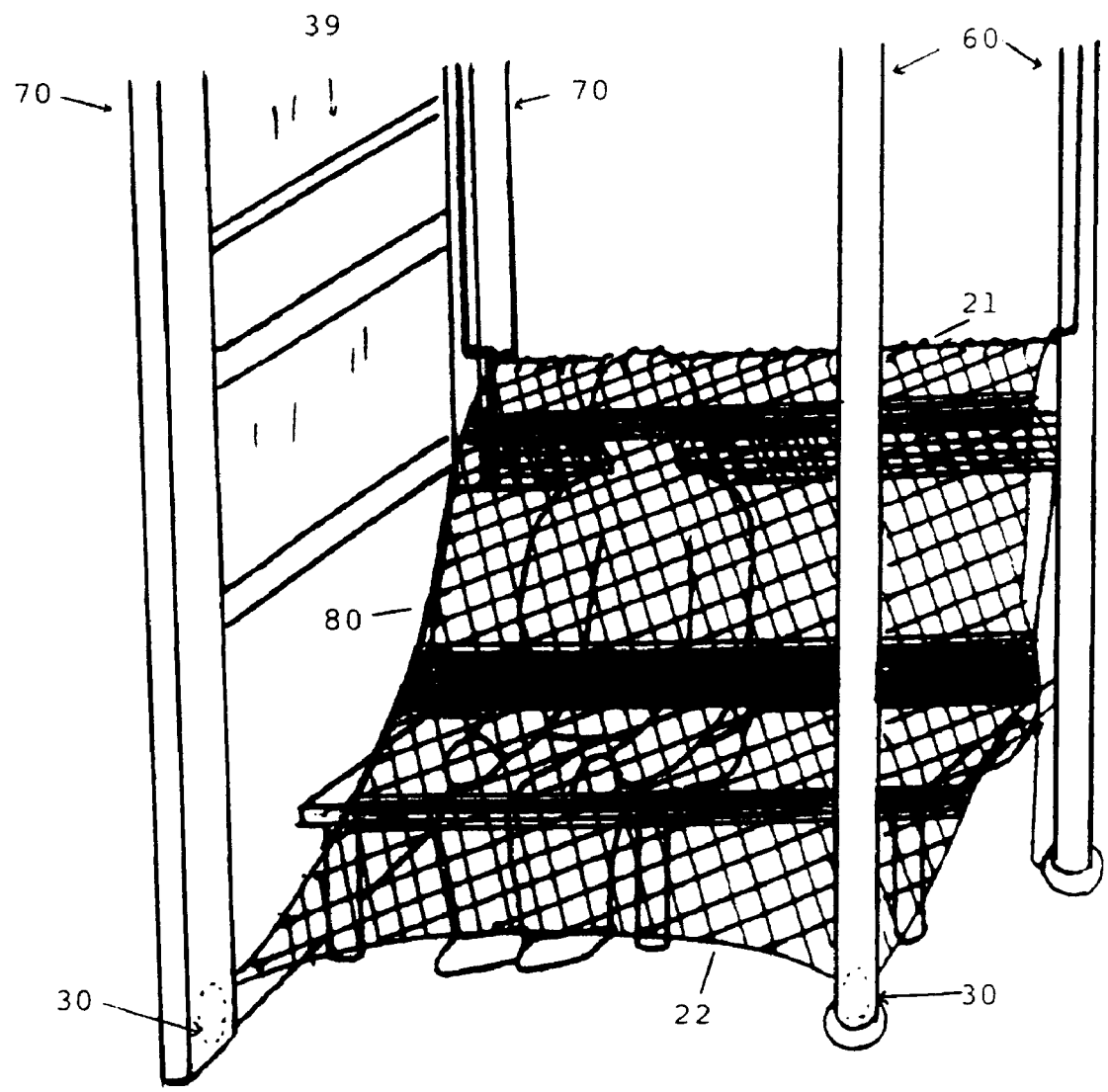
FIG. 2 is a frontal view of the retraining safety web fully deployed and showing the full length of the head and neck protection headboard showing also are the vertical length of the square tubes by the window and the round handle bars at the opposite side, both have cavities where cords are placed and sealed.

Referring to FIG. 2 is the frontal view of the restraining web 22 and the head and neck protection device 21 fully deployed restraining rider 80 and anchored at bottom end of the square tube 70 next to the window and also anchored at the bottom end of the round handle bar at the opposite side.

Figure 3:
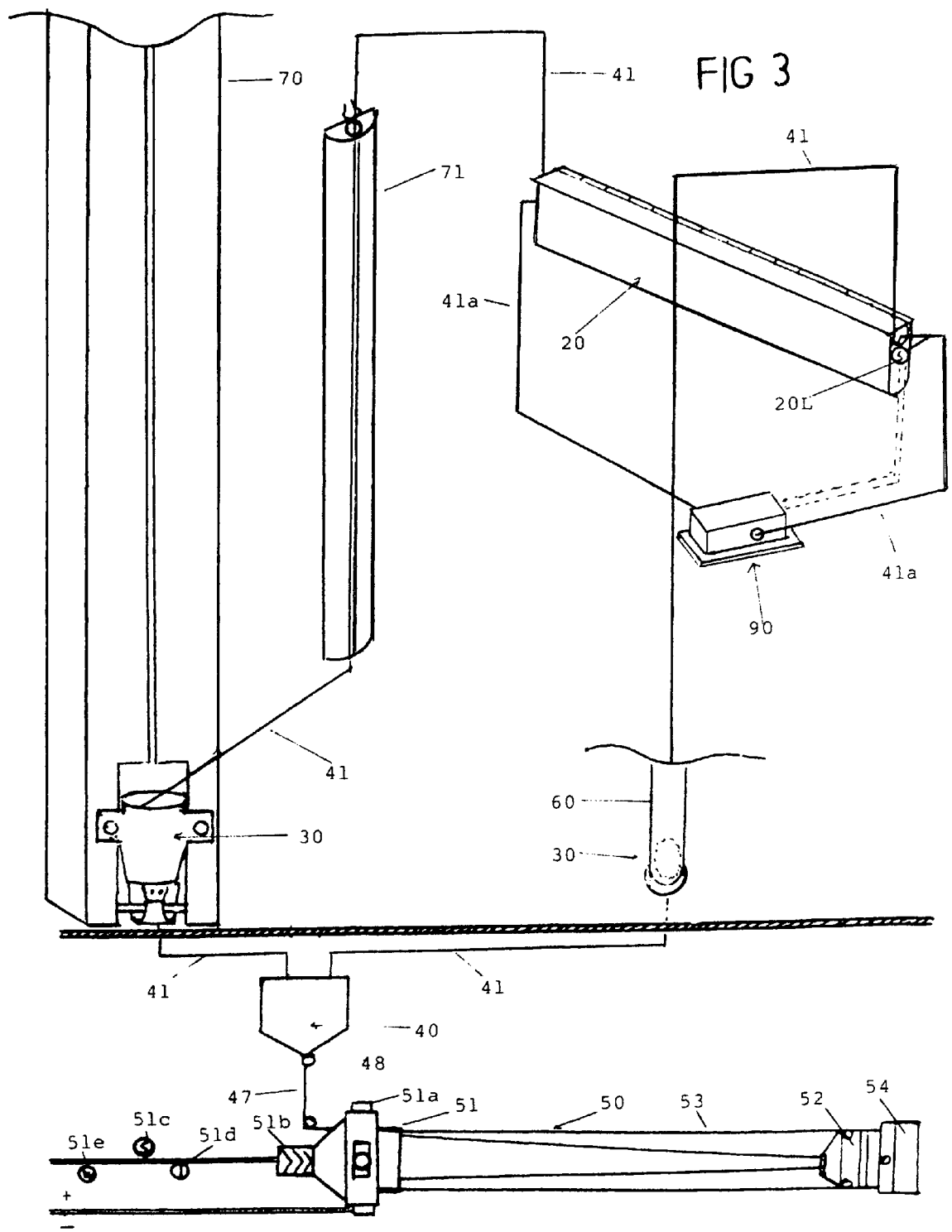
FIG. 3 is the lay out of all the components of the transportation riders web restrain system.

Referring to FIG. 3 showing all the components of the web linking together. The web case 20 attached with a switch 22L for the leaf-spring retriever 90. Leading out from case 20 are cords 41 and 41a to flexible moulding 71 and tubes 70 and 60. A sensor 51c detects collision imminent situation activates the warning system 51e and the manual switch 51d which in turn ignite the charge in the cylindrical power housing 51b of the cord retriever 50 that will propel the piston 52 down to the bottom of the cylinder 53 with cord 47 joined with a split ring 48 together with cords 41 pulled through organizer-equalizer 40 and anti-reverse anchor-routers 30 effectively deployed and anchored the safety retraining web. Housing 51 contains cord control element 51a which regulates which cord to be retrieved when are equipped with multiple cord option. End cap 54 cushions the piston and vents the pressure of the cylinder.

Figure 4:
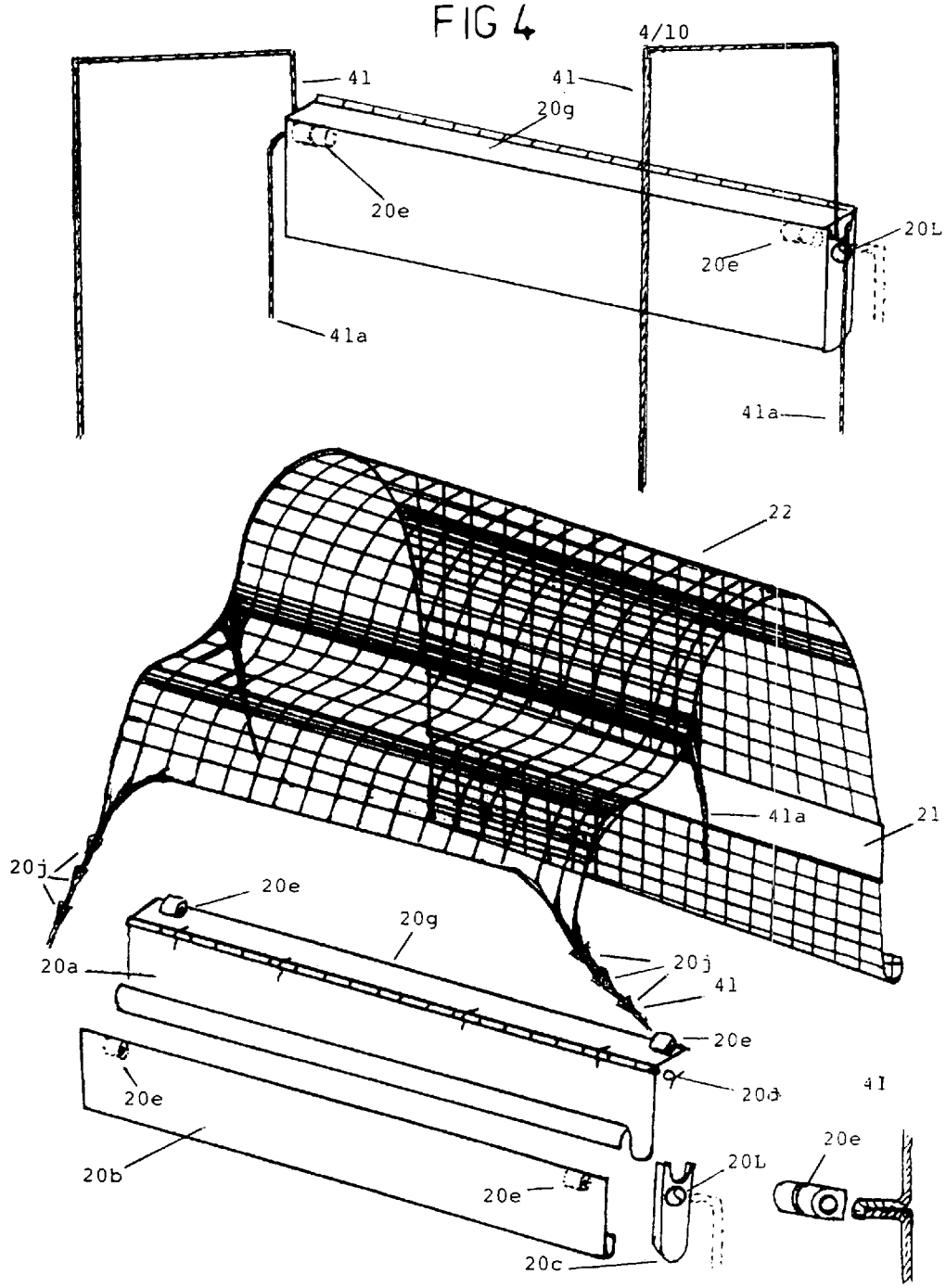
FIG. 4 is showing the restraining web in a tailor made case complete with cords in the stored position also showing are the components from inside the case when they are all apart.

Referring to FIG. 4 showing the restraining web 22 in a case 20 with springs 20d hinged lid 20g, cords 41 and 41a leading out the outlets of the case of which one of them will activate a switch 22L which in turn activate the leaf-spring cord retriever 90 which tightens mid section of the web. A latch system 20e will dictate the open and close of the lid 20g. The web 22, with head and neck protection device 21 and also has tapered thick portions at the cords 20j, is bonded together at the bottom end with the two halves of the case 20a and 20b. Caps 20c retain the case together at both ends.

Figure 5:
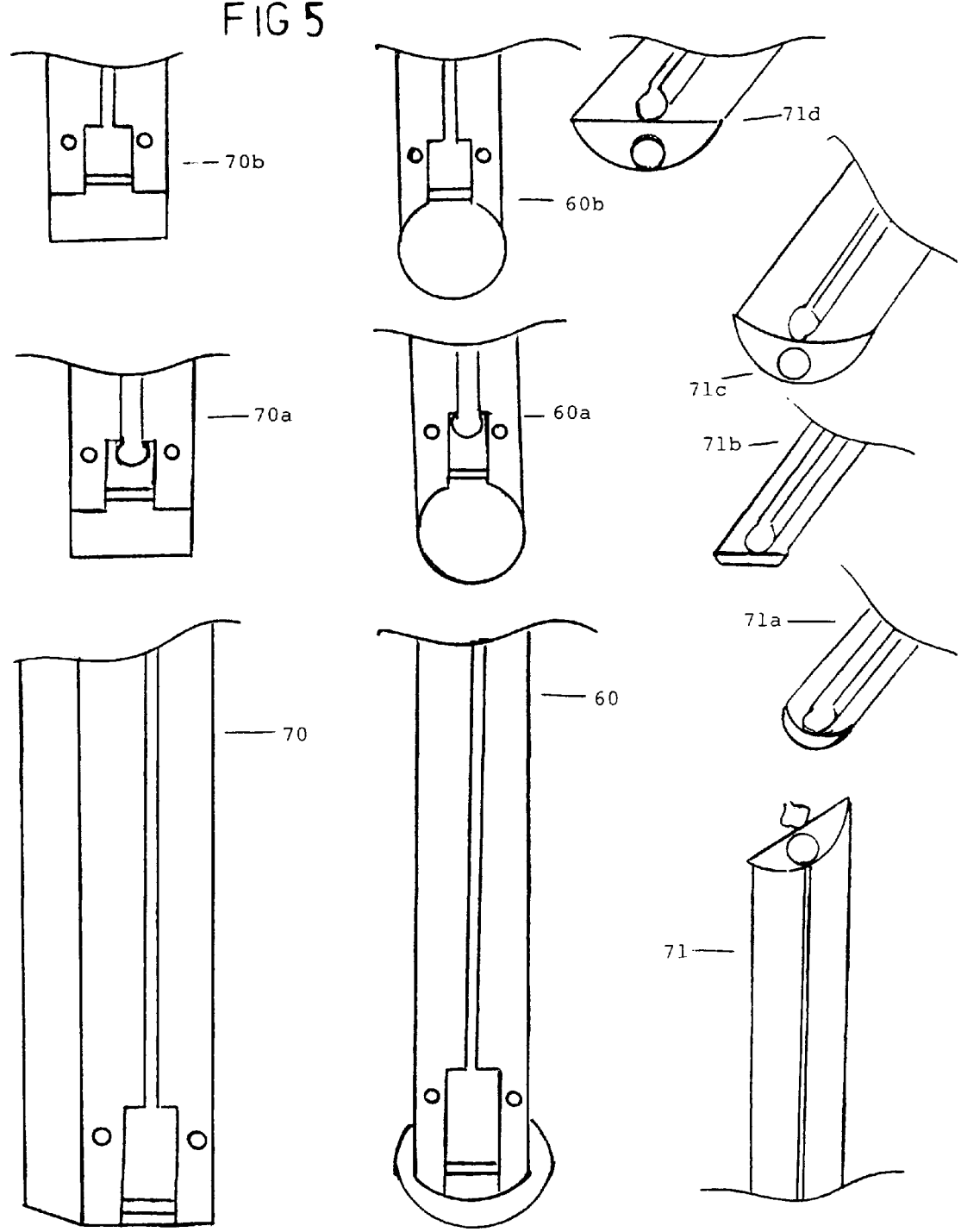
FIG. 5 is showing the square tubes and the round poles in standing position and laid down position showing the cavities that accommodate inside cord or outside cord. Also showing are the flexible mouldings to fit flat surface and to fit round surface and inside and outside cavities of the tubes and poles.

Referring to FIG. 5 showing two kinds of tubes 70 and 60 where cords 41 together with flexible mouldings 71 are fitted to their respective cavities. At the bottom of those tubes are crossbars to hook up the anchor-routers 30. Tubes 70a and 60a are laid flat to show the inside chambers where cords 41 are fitted inside and concealed with mouldings 71a or 71b. Tubes 70b and 60b are laid flat to show the slit cavity where cords 41 are fitted together with moulding 71c or 71d. Moulding 71 is viewed at the upright position.

Figure 6:
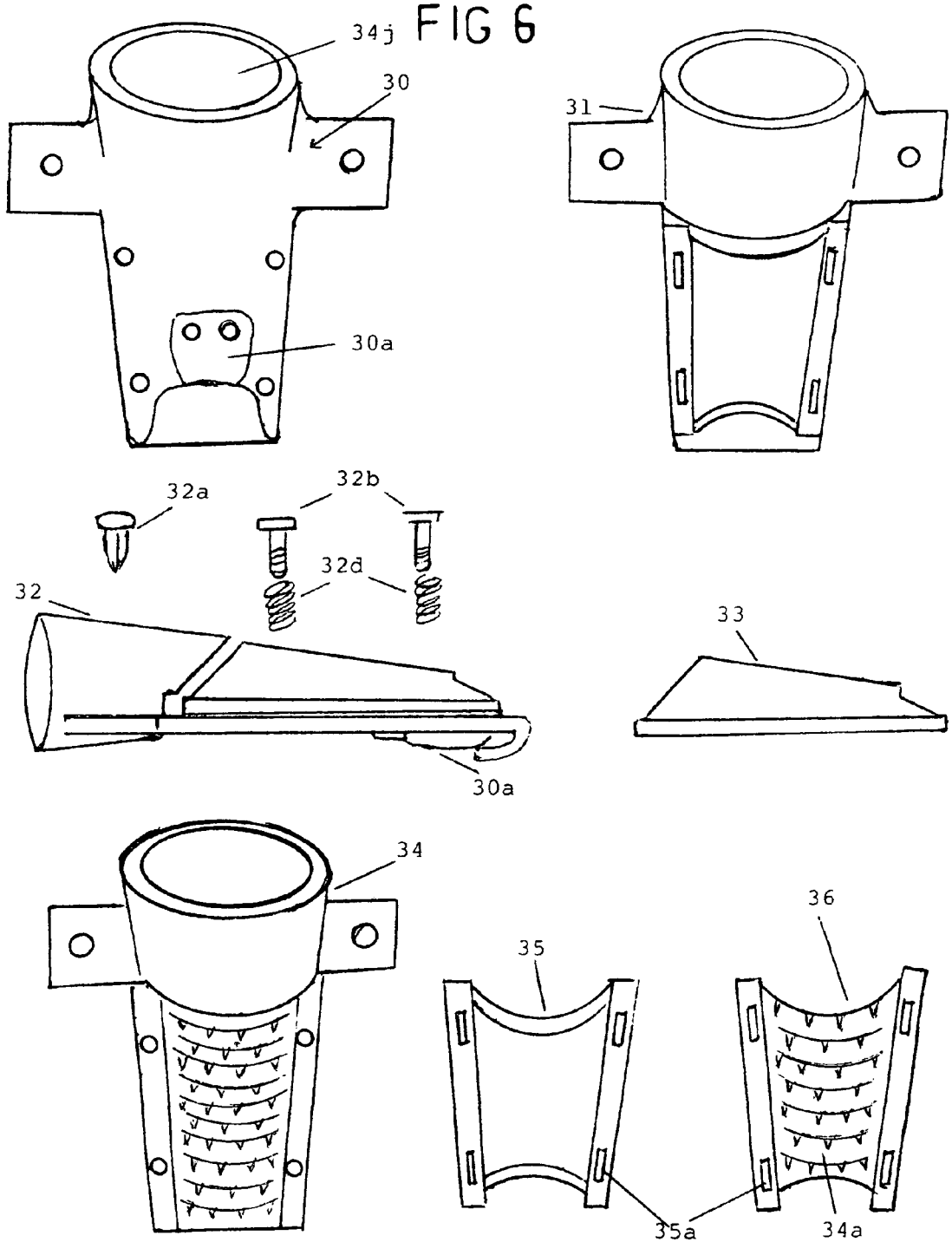
FIG. 6 is showing the anchor-router front view and back view, showing also is one half of its main body which is spring loaded, there are pointed small sharp teeth inside both halves.

Referring to FIG. 6 is the frontal view of the anchor-router 31 and the back view of the anchor-router 30 and showing also the flexible piece 30a for hook up means. Anchor-router 32 laying down viewing side way and one half 33 removed. Two of the four bolts 32b with springs are for retaining the half 33 in place with pressure. Numerous fine teeth 34a pointing out the small end of the device to ensure non-reversal of the cords. Spring plug 32a is one of two for installation of the anchor-router onto its site and of easy to remove.

Figure 7:
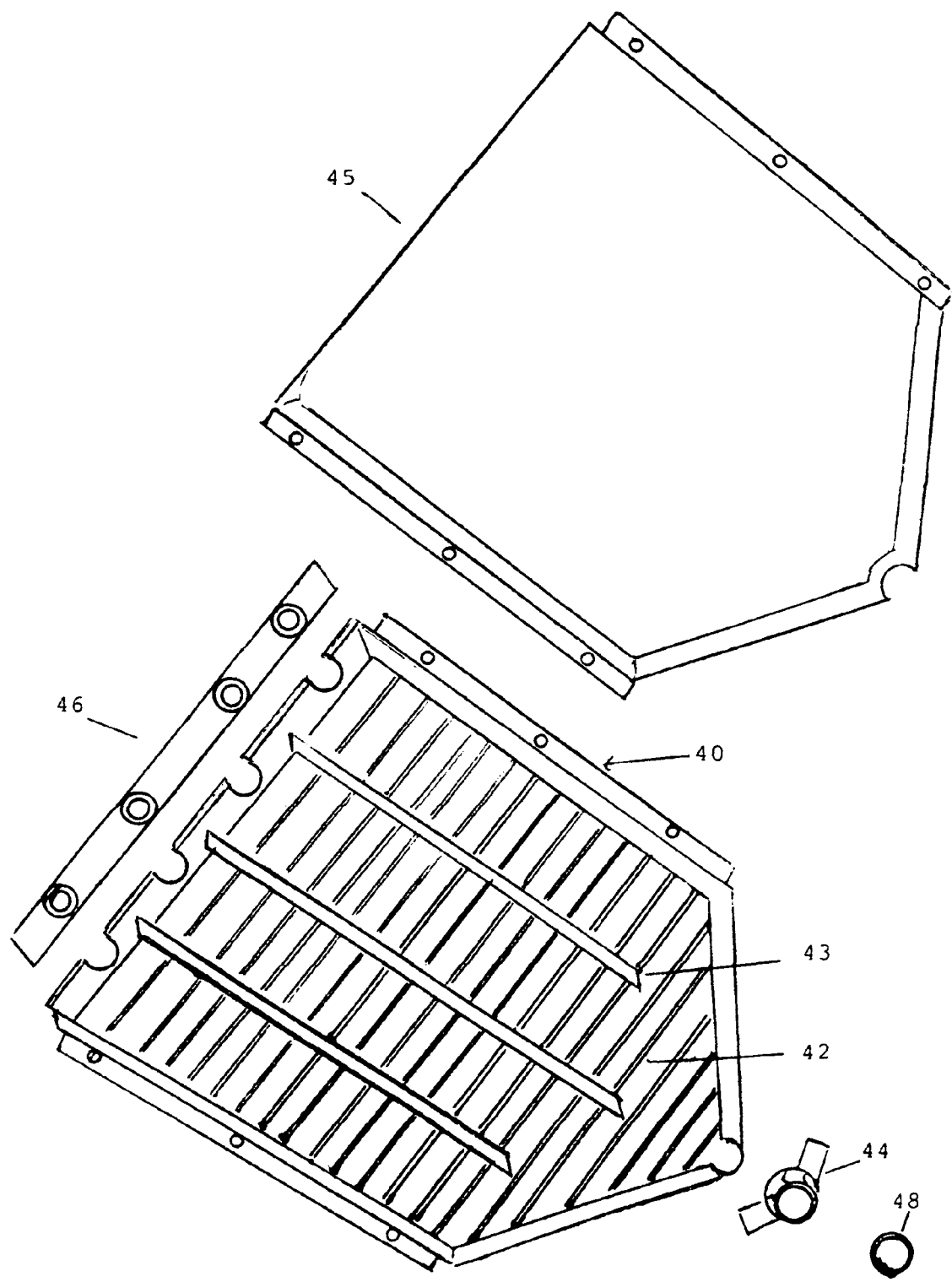
FIG. 7 shows the cords organizer-equalizer case in two open halves and metal eyelets and junction split ring.

Referring to FIG. 7 is the equalizer-organizer 40 with the cover 45 open, both pieces are of the same feature with ribs 42 and dividers 43 are for keeping the cords 41 in orderly and untangle fashion. Eyelet bar 46 and a single eyelet 44 are made of metal to minimize cord burn. Cords 41 and cord 47 are joined together with the junction split ring 48 which will be straightened when tension exceeds a set limit.

Referring to FIG. 8 is showing the cylindrical power cord retriever 50 equipped with sensor 51c, warning device 51e and manual switch 51d together they give signal to the charge housing 51b to propel piston 52 which in turn retrieves cord 47 together with cords 41 to deploy the restraining web 22. Piston 52 is fitted with a seal 52c and a spring 52b loaded slinger 52a which will be released at the bottom of the cylinder 53 where the end cap 54 with a dust cap is located, tension of cord 47 is also released together with the slinger 52a. Housing 51 is fitted with multiple cord controls 51a where hook ring 47a is attached linking with cord 47.

Figure 9:
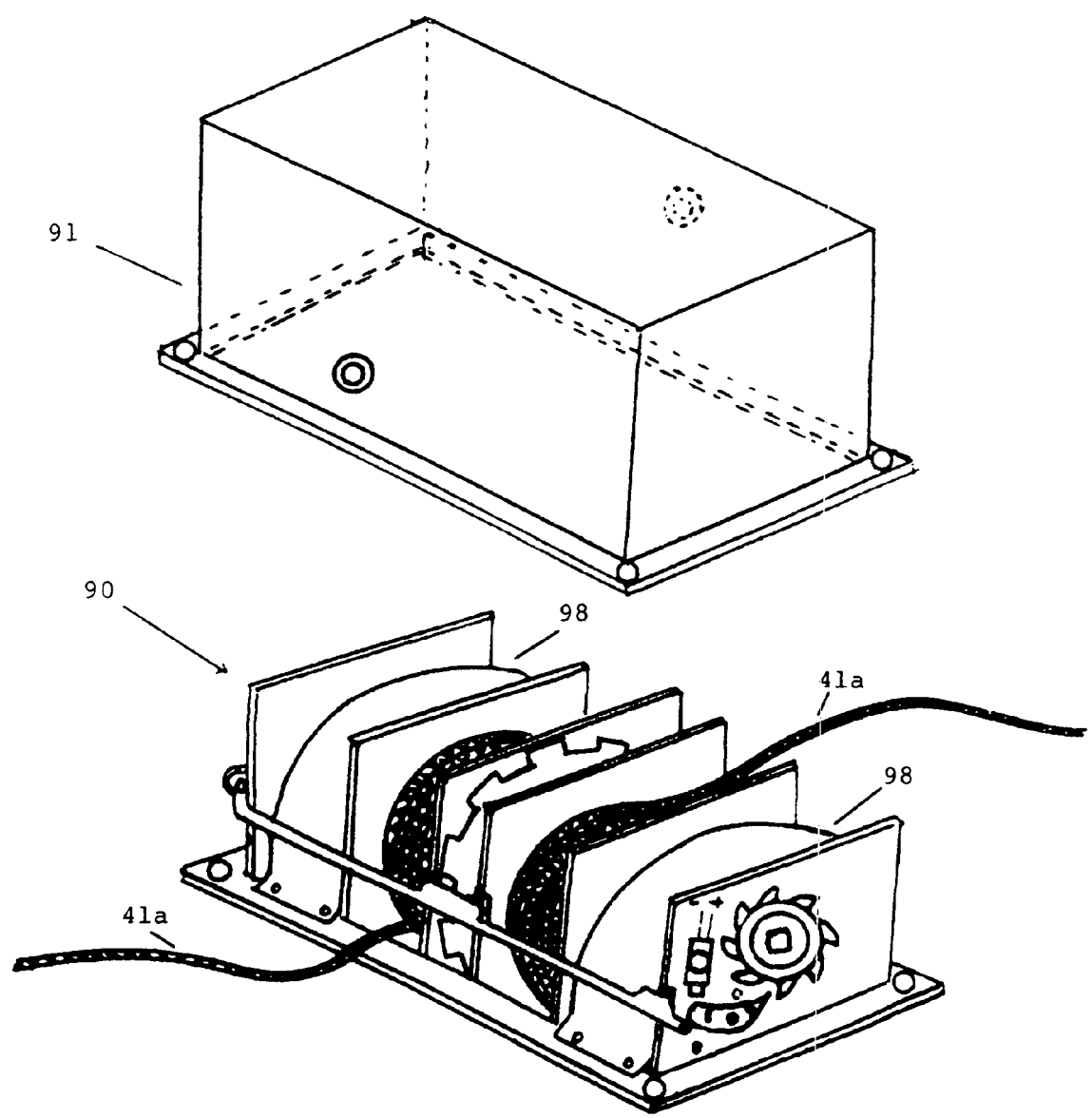
FIG. 9 shows the double leaf-springs cord retriever in whole and with the cover open.

Referring to FIG. 9 is the double leaf-springs cord retriever 90 with its cover 91 open showing the dual leaf-springs 98 and the dual cords 41a which connecting the mid section the restraining web 22.

Referring to FIG. 10 is showing the chassis 91 of the double leaf-springs cord retriever 90 with snap ring 97, retaining washer 96 and camshaft 94 removed to show the key 99 to wind the leaf-springs 98 the locked gear 95 with a long flip bar 92. To begin retrieve cords 41a, striker 93b will strike one end of the spring 93a tensioned anti-reverse cam 93 which will hit the anti-reverse gear 94e to release tension and unlock the bar 92 at the same time. Cords 41a when retrieved will be tightened up the mid section of the restraining web 22 near the abdomen area of a person.

CONCLUSION

It can now be seen that the present invention solves many of the problems associated with the prior art. The present invention confines riders within the deployed restraining web therefore effectively preventing riders from hurtling against other objects within the vehicle, the safety web is made of netting material that enables a person to see through and therefore maneuver accordingly, and a person can unhook the web and walk away. The riders restraining web system does not need the participation of the riders, the web wraps around protects a person from head to feet, it is simple to reset and reuse again after deployment. The present invention can be easily adapted to fit other forms of vehicle.

Although the description above contains many specifications, these should not be construed as limiting the scope of the invention but merely providing support to the illustrations of the preferred embodiment of this invention. For example, tubes used to tug away cords can be of the cavities inside of the vehicle and or fabricated special contoured frames and mouldings for low profiled vehicles, and silicone can be used for sealing instead of flexible moulding and still permit smooth operation of the safety web, when to store the web in a case is not practical then to incorporate the use of a seat is the solution or for a low profile vehicle is to incorporate the web with the ceiling just above the seat is another way for set up and storage.

Thus the scope of this invention should not be determined by the appended claims and their legal equivalents, rather than by the examples given herein.

What is claimed is:

1. A transportation riders web restraint system for protecting occupants of a vehicle against the impact from a collision comprising:
   a vehicle, comprising:
      at least one vehicle seat designed for an occupant to be seated thereupon;
      a restraining web stored in a storage case, said storage case located behind said at least one vehicle seat;
      a plurality of tubes, comprising a first set of tubes extending upwardly from said case, and a second set of tubes extending downwardly in front of the first set of tubes, wherein each of said plurality of tubes has a long slit cavity;
      a plurality of cables attached to at least one end of the restraining web, a portion of said plurality of cables located on the respective right and left side of the at least one vehicle seat, and located within the cavities formed in the plurality of tubes;
an anchor-router;
an equalizer-organizer; and
a piston and cylindrical power retriever, configured to pull said cables thereby deploying said restraining web.

2. The system of claim 1, wherein said plurality of cables further comprise at least one tapered cone portion, and wherein the anchor-router is shaped in the form of a tapered cone, and configured to catch said tapered cone portions of the plurality of cables.

3. The system of claim 1, wherein said restraining web is made of netting material that enables a person to see through and maneuver the vehicle.

4. The system of claim 1, wherein said equalizer-organizer comprises numerous ribs and dividers and functions as a cable housing.

5. The system of claim 1, wherein said cylindrical power retriever includes a piston inside a sealed cylinder, and an ignition charge, wherein said piston is coupled, via a coupling, with said plurality of cables, wherein the ignition of said ignition charge propels the piston to a distance, thereby pulling the plurality of cables and deploying the restraining web to protect a rider from movement caused by the impact of an accident.

6. The system of claim 5, wherein said equalizer-organizer comprises numerous ribs and dividers and functions as a cord housing, wherein said equalizer-organizer further comprises a means for joining together said plurality of cables, and a coupling for connecting said joined together plurality of cables to said piston of the cylindrical power cord retriever.

7. The system of claim 6, wherein said coupling comprises a coupling cable.

* * * * *